Figure 1:
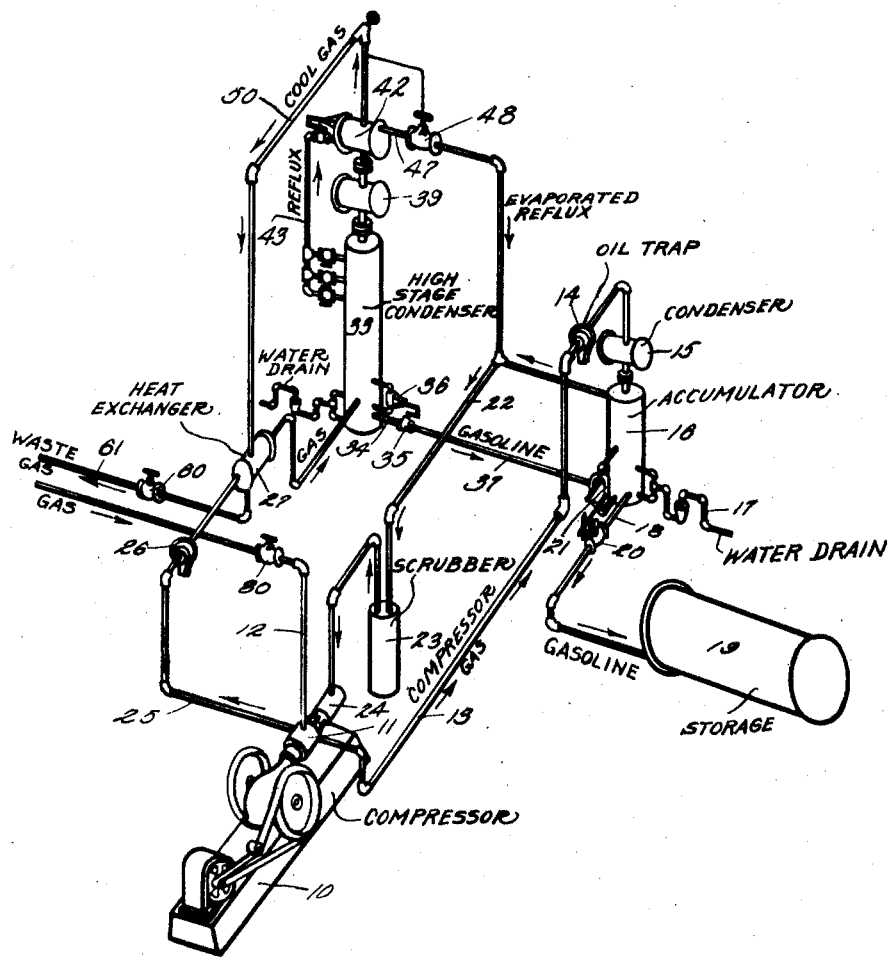

Feb. 23, 1932.  F. L. KALLAM  1,846,206
PROCESS FOR RECOVERY OF NATURAL GASOLINE
Filed Aug. 3, 1927  2 Sheets-Sheet 1

Feb. 23, 1932.   F. L. KALLAM   1,846,206
PROCESS FOR RECOVERY OF NATURAL GASOLINE
Filed Aug. 3, 1927   2 Sheets-Sheet 2

Inventor
Floyd L. Kallam
by
his Attorney

Patented Feb. 23, 1932

1,846,206

UNITED STATES PATENT OFFICE

FLOYD L. KALLAM, OF SOUTH GATE, CALIFORNIA

PROCESS FOR RECOVERY OF NATURAL GASOLINE

Application filed August 3, 1927. Serial No. 210,380.

This invention has to do with a method for the recovery or extraction of liquids from gases or vapors, and it is a general object of the invention to provide a method of commercial value and particularly suited for the recovery of liquid hydro-carbons.

This invention provides primarily, a method for the extraction or recovery of liquids from gases and/or vapors. In view of the fact that the invention is particularly suited for the treatment of gas, for instance, natural gas for the extraction of liquid hydro-carbons therefrom, I will confine this disclosure to such application of the invention, it being understood, however, that the broader principles of the invention are not to be considered limited to this or any other specific application.

Natural gases such as are available for the production of liquid hydro-carbons or natural gasoline usually contain light or volatile hydro-carbons, such as butane and propane. These values being volatile, are undesirable in the recovered gasoline and materially lower its commercial value.

The compression method of recovering what is known commercially as gasoline from natural gas has certain characteristic advantages over other known methods and has the disadvantage that the recovered liquid contains propane and butane. The cost of installation and operation of apparatus for carrying out the compression method is comparatively low, however, the presence of butane and propane in the recovered product makes it necessary under present commercial conditions to blend light naphtha, or the like, with it before it can be marketed.

The absorption method, which consists generally in bringing the gas or petroleum vapors into intimate contact with a liquid absorbent, generally a distillate or gas oil, at as low a temperature as is economically possible, and at pressures ranging from a few to several hundred pounds, has practically displaced the compression method as the resultant product is suitable for immediate commercial use, and as the recovery is very high, in fact practically 100%. In the absorption method, the gasoline is recovered from the absorbent by distillation, the absorbent being cooled and recirculated. The superiority of the absorption process, due to the introduction of liquid into the system for the beneficial effect of partial pressure lowering, is, when considered from a thermal standpoint, its chief disadvantage. The liquid absorbent must be heated to approximately 310 degrees F. in the still to effect the removal of its gasoline content, and then cooled to at least 75 degrees F. before it is reintroduced into the absorber for further contact with the gasoline bearing gas. This periodic heating and cooling of the oil, which is an inert and extraneous material, so far as the heat balance of the cycle is concerned, requires large amounts of fuel and water cooling, resulting in high production costs. Further, the first cost of an absorption plant is high compared to that of a compression plant, as considerable auxiliary machinery is required and further there is considerable danger and fire hazard incidental to the operation of the still.

It is a general object of my present invention to provide a method which has the desirable characteristics of the absorption method and results in a high recovery of a desirable product.

It is another object of my present invention to provide a method of the character mentioned, by which an absorbing medium is produced to act as an absorbent for the desired product.

It is another object of this invention to provide a method of the character mentioned, in which temperature need not be carried lower than 40 degrees F. and employing normal compression pressures and requiring an absorbent in an amount no greater than about five gallons per thousand cubic feet of gasoline treated.

Another general object of the invention is to provide a method of gasoline recovery possessing the advantages and simplicity of the commercial compression method, together with the complete recovery and desirable results of the absorption method. The small amount of liquids handled and the nominal pressures and temperatures involved in carrying out my method result in comparatively simple inexpensive apparatus. These factors also make possible simple or automatic control highly desirable in small installations.

It is another important object of my invention to provide a method for recovering gasoline free of undesirable elements, such as propane and butane, without distillation. In carrying out this object of the invention, I provide a method which is safe and free of the hazards accompanying the usual absorption methods.

Another important object of my present invention is the utilization of a portion of the reflux or liquid produced within the apparatus as a refrigerating medium for controlling temperature in the apparatus.

Another object of the invention is to utilize the refrigerating medium just mentioned without the use of auxiliary equipment such as compressors, or the like.

A further object of the invention is to provide an automatic control for the refrigerant above referred to.

Figure 2:
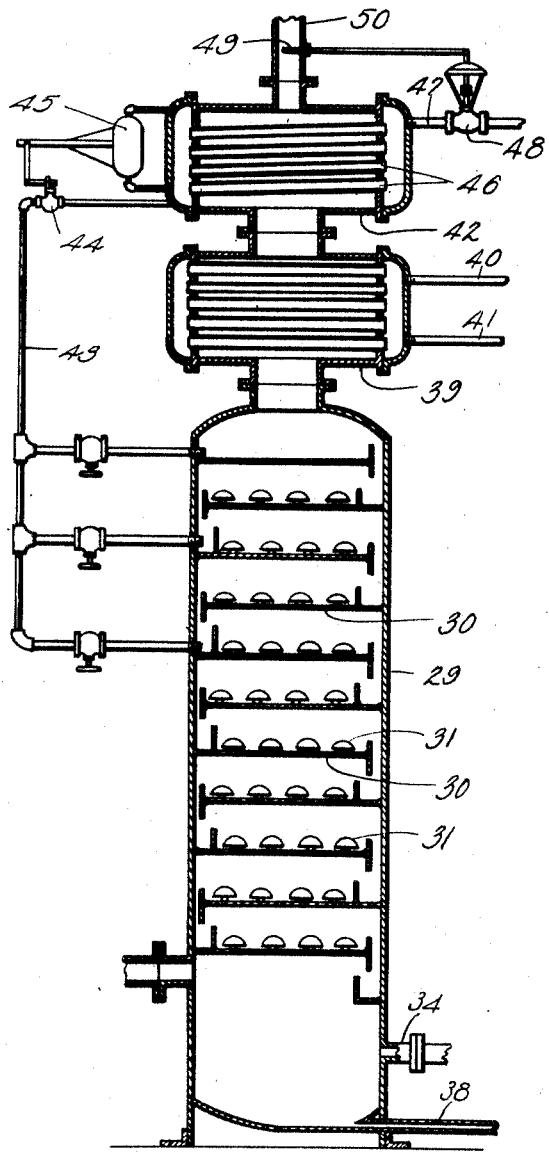

The various objects and features of my invention will be best and more fully understood from the following detailed description of a typical form and application of the invention applied to the recovery of gasoline from natural gas or petroleum vapors, throughout which description I will refer to the accompanying drawings disclosing apparatus for carrying out my invention, in which drawings Fig. 1 is a perspective view illustrating the general assembly of the equipment provided by my invention for carrying out the process, and Fig. 2 is a vertical detail sectional view of one of the principal parts of the apparatus.

For the reasons pointed out above, I have confined the present specific disclosure of my invention to the art of extracting gasoline from natural gas or petroleum vapors. Because of the present state of the art, and the many varying conditions encountered, it is not possible to specify details applicable to any gas. At present it is most desirable to recover from the gas a mixture of hydrocarbons most nearly comprising the commercial fractions known as natural gasoline. I, therefore, will proceed to set forth a method embodying a reflux wash for a condensing and absorbing of the vapors to be produced as herein described, which will be found generally suitable in practice for gas ordinarily treated and for the grade of liquid product usually desired. To obtain an understanding of the invention, I believe it best to first set forth a general description of the apparatus as to its arrangement and construction of parts, after which I will more fully point out features characterizing my process.

The invention provides, primarily, for an initial compression of the gas or petroleum vapor, for the separation of the gasoline and water produced by the initial compression from the remaining vapor, further or high compression of the said remaining vapor, cooling of the high compressed vapor, passage of the cooled compressed vapor through a condensing and absorbing tower to be cooled and contacted with a reflux formed by the condensation of compressed vapors, passing the gases from the top of the tower through a water cooled reflux condenser, passing the gases from the water cooled reflux condenser to an evaporator reflux condenser, withdrawing a portion of the lighter fractions from the upper portion of the tower for expansion in the evaporator reflux condenser to act as a refrigerant, and the withdrawal of the desired stable gasoline from the bottom of the tower.

In practice, my apparatus may include various elements or units of equipment common to plants used in carrying out the compression method of gasoline recovery. The two compression operations provided by my method may be carried out in a two stage compressor 10 having a low pressure cylinder 11 receiving the gas or petroleum vapor through an intake pipe 12. A back pressure regulator 80 is provided in the pipe 12 so that it throttles the compressor suction and prevents the pressure at the receiving side from falling below a certain predetermined value. This assumes an electric drive, and hence a constant speed compressor. In the case of a steam driven compressor, the same back pressure valve would be arranged to throttle the steam supply, thus changing the compressor speed as required to maintain the desired suction pressure. The discharge from the low pressure cylinder 11 may be conducted by a pipe 13 through a suitable oil trap 14 to a low stage gasoline condenser 15. The low stage gasoline condenser 15 may be of the water cooled type common to installations of this character and may be arranged to discharge into a low stage accumulator 16 fitted with a water drain 17 and a gasoline drain 18. The gasoline drain 18 may conduct the gasoline from the accumulator 16 to a storage tank 19 under control of a valve 20 operated from a suitable float mechanism 21. The vapors from the top of the low stage accumulator may be passed through a pipe 22, through a suitable scrubber 23 and into the high pressure cylinder 24 of the compressor 10. The scrubber 23 is designed to remove from the gas stream any entrained gasoline or water. The pipe 22 discharges the gas to the intake or suction of the high pressure cylinder 24. The gas is compressed in the cylinder 24 to a comparatively high pressure, say from 100 to 300 pounds per square inch. The highly compressed gas is delivered by the cylinder to a pipe 25 that conducts it through an oil trap 26 through a heat exchanger 27 and into what I will term a high stage condenser 33. The oil trap 26 operates to remove lubricating oil present in the gas stream. The heat exchanger operates to cool the gas, the cooling medium being wild vapor taken from the discharge of the evaporator reflux condenser hereinafter described.

The high stage condenser acts as a condensing and absorbing tower and is in the nature of a bubble tower or dephlegmator. The tower includes a vertically disposed body 29 and a plurality of trays or bubble pans 30, spaced one above the other in the body, and fitted with bubble caps 31 or other suitable means whereby gases or vapors introduced into the lower portion of the tower are brought in direct contact with the liquid carried in the pans. The gases from the pipe 25 are introduced into the lower portion of the body 29 of the tower so that they pass upwardly through and between the many bubble pans with the result that they are condensed and certain of their parts or fractions absorbed by the liquid in the pans. The lower portion of the high stage condenser 33 is provided with a gasoline outlet 34 under control of a valve 35 operated by a suitable float control 36. The gasoline discharged through the valve 35 may be conducted by a pipe 37 to the bottom of the low stage accumulator 16 or directly to a storage tank. The bottom of the high stage condenser 33 is fitted with a water drain 38 for the removal of any water that may accumulate.

The gases or vapors passing from the top of the high stage condenser pass into a first control or water cooled reflux condenser 39 where they are cooled by cooling water introduced and removed through pipes 40 and 41 respectively. The cooled gases discharging from the water cooled reflux condenser 39 enter the evaporator reflux condenser 42 in which they are further cooled by the expansion of light fractions taken from the top or upper portion of the high stage condenser. The light fractions or refrigerant is conducted from the upper portion of the high stage condenser 33 to the evaporator reflux condenser 42 by a pipe 43. The pipe 43 may have connection with several of the upper bubble pans of the condenser 33. The refrigerant is admitted into the condenser 42 through an admission valve 44 operated by a float control 45. The float control 45 operates to regulate the valve 44 so that the desired level of refrigerant is maintained in the condenser. In the particular condenser design illustrated, the refrigerant is circulated through tubes and the gases being cooled, circulate around the tubes. The liquid drawn from the upper pans of the condenser 33 is a volatile hydro-carbon liquid at the tower pressure. This pressure may be between 100 and 300 pounds gauge. This liquid is not a simple substance similar to commercial refrigerants, that is, ammonia, carbon dioxide, etc., but is a combination of liquid hydrocarbons having a range of boiling points perhaps of 20 degrees F. to 75 degrees F. The evaporation of this type of refrigerant in the tubes of the evaporator condenser, caused by the warm vapors to be cooled passing around the tubes, can be made to occur through whatever range of temperature, always, of course, within the boiling range of the refrigerant, at the operating pressure, as desired. This may be accomplished by tilting or pitching the tubes 46 and admitting the refrigerant into the lower ends of the tubes, and removing the evaporated refrigerant from the upper ends of the tubes. An outlet 47 is provided in the head of the condenser at the higher ends of the tubes to conduct the vaporized refrigerant from the condenser. The outlet 47 is fitted with a motor valve 48, under control of a thermostat 49 in the condenser outlet 50 which conducts the cooled gases from the condenser.

It is to be understood that the construction of the high stage condenser, and the two control condensers, may be varied as desired, without departing from the spirit of my invention.

From the foregoing description, the general mode of operation of the apparatus and the principles of the method will be understood. The initial or first compression of the original rich gas to a pressure of about 30 to 40 pounds results in the production of a considerable amount of stable gasoline that is recovered in the accumulator 16 and delivered to the storage tank 19. The water formed by the initial compression is received by the accumulator and is separated from the gasoline at the accumulator. The uncondensed gases or vapors taken from the accumulator 16 are put under high pressure by the second stage compression occurring in the high pressure cylinder 24 of the compressor. The gases leaving the high pressure stage of the compressor 10 are under a pressure of from 100 to 300 pounds and after passing through the heat exchanger they are at a temperature of 100 to 150 degrees F.

The gases entering the lower portion of the high stage condenser are contacted with the cold or cooled gasoline reflux formed previously from gases or vapors. The apparatus is regulated so that the vapors leaving the lower water cooled reflux condenser are from 80 to 85 degrees F., while the vapors leaving the evaporator reflux condenser are approximately 40 degrees F. This low temperature in the evaporator reflux condenser is produced as above described from the lighter liquids present in the top of the high stage condenser. Control of the quality of liquid to be evaporated is effected by the thermostat 49 which operates the motor valve 48 to control the vapor discharge from the condenser. The cold vapor or gas stripped of recoverable gasoline may be conducted through the discharge pipe 50 from the evaporator reflux condenser and may be utilized as the cooling medium in the heat exchanger. This wild vapor, after absorbing heat from the high pressure vapor entering the high stage condenser may be discharged through a regulator valve 60 into a distributing pipe 61. The dry or wild gas may be used as fuel.

I wish to call particular attention to the fact that the high stage condenser 33 is in my process more than an ordinary condenser. Further, I wish to point out that the principles involved in my process are applicable to many combinations of hydro-carbons at the various and essential pressures and temperatures, and I do not confine the invention to the recovery of hydro-carbons no lighter than butane as might be inferred from statements contained above. It is to be noted that I provide for contacting the condensable vapors with a reflux of hydro-carbons provided by control sections located at the top of the tower. By this means the latent heat is removed from the vapors and at the same time the excess amount of reflux provided, removes the necessary sensible heat. The resulting condensed and cooled liquid produced accumulates at the bottom of the tower to be withdrawn as the finished liquid. It will be obvious that I may, if necessary, provide a conventional gasoline cooler for the finished liquid removed from the high stage condenser. However, the gasoline removed is very stable and therefore a cooler may not be necessary. At this point, I may also point out that an additional supply of reflux for the high stage condenser may be introduced into the condenser if found necessary. If additional reflux is necessary, the gasoline recovered after the first stage compression may be used.

Through the control sections, that is the condensers 39 and 42, the temperature of the outgoing vapors from the tower may be held relative to the tower pressure so that only vapors lighter than propane will leave the tower. Similarly, by regulation or manipulation of the heat exchanger, the temperature of the inlet vapors to the high stage condenser 33 may be controlled. A temperature gradient is thus established through the tower, being in the case mentioned approximately 40 degrees F. at the top and 90 to 95 degrees F. at the bottom. The result of this regulation is that the propane is reevaporated at some point in the tower and upon reaching the control sections, is again condensed and thrown back to the upper pans of the tower. That portion of the butane reevaporated goes through a similar cycle. Thus, upon the uppermost pans of the tower will be found, depending upon pressure and temperature, and the nature of the vapors, a liquid composed chiefly of propane together with some butane. Because of the complexity of the hydro-carbon series and the fact that they are soluble, one in the other, it is not possible to obtain a definite cut or isolation of any one particular member of the series upon any one pan, or pans. However, by proper regulation of pressures and temperatures, it is possible to eventually segregate or collect the greater portion of the butane and all of the heavier hydro-carbons at the bottom of the tower. In so doing, these liquids act aside from a condensing and cooling medium, as an absorbent. In this they are extremely efficient, especially the butane for recovering hydro-carbons constituting what is considered natural gasoline. Further, this absorbent is brought into contact with the vapors to be absorbed under a most desirable pressure and temperature condition, with the result that a substantially complete recovery is made. The apparatus, when once adjusted for operation under given conditions, functions automatically and continuously.

Having described only a typical preferred form of my invention, I do not wish to limit myself to the specific details set forth, but wish to reserve to myself any changes or variations that may appear to those skilled in the art or fall within the scope of the following claim.

Having described my invention, I claim:

The process of recovering natural gasoline from gas including, initially compressing and cooling the gas to obtain a portion of the gasoline, separating the gasoline from the remaining gas, further compressing the remaining gas, initially cooling the further compressed remaining gas, contacting the further compressed and initially cooled gas with a reflux liquid that condenses and absorbs the liquid-forming constituents of the gas, expanding the lighter liquids obtained to a pressure lower than that at which the gas and reflux contact and bringing them into heat exchange relation with the remaining gas so as to partially condense the vapors contained in said remaining gas to form additional reflux, the said further compressed gas being initially cooled by gas that has passed the reflux liquid.

In witness that I claim the foregoing I have hereunto subscribed my name this 29th day of July, 1927.

FLOYD L. KALLAM.